(12) United States Patent
Gilley

(10) Patent No.: US 8,015,893 B2
(45) Date of Patent: Sep. 13, 2011

(54) RETAINER FOR PARKING GEAR PIVOT

(75) Inventor: Mark Gilley, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 938 days.

(21) Appl. No.: 11/935,792

(22) Filed: Nov. 6, 2007

(65) Prior Publication Data

US 2009/0114788 A1    May 7, 2009

(51) Int. Cl.
*F16H 3/34*    (2006.01)
*F16H 57/02*    (2006.01)

(52) U.S. Cl. ........................................ 74/354; 74/606 R
(58) Field of Classification Search .................. None
See application file for complete search history.

(56) References Cited

U.S. PATENT DOCUMENTS

| | | |
|---|---|---|
| 2,505,899 A | 5/1950 | Jobe |
| 2,733,492 A | 2/1956 | Copell |
| 3,420,482 A | 1/1969 | Taylor |
| 4,197,616 A | 4/1980 | Panuski |
| 4,369,947 A | 1/1983 | Kuwano et al. |
| 4,680,915 A | 7/1987 | Bush |
| 4,724,643 A | 2/1988 | Marsh |
| 4,806,895 A | 2/1989 | Petrow |
| 4,903,920 A | 2/1990 | Merritt |
| 4,928,917 A | 5/1990 | Wolf et al. |
| 5,411,228 A | 5/1995 | Morawa et al. |
| 5,588,683 A | 12/1996 | Schliessner et al. |
| 5,845,545 A * | 12/1998 | Braun et al. ................. 74/606 R |
| 6,267,333 B1 | 7/2001 | Hebert et al. |
| 7,152,724 B2 * | 12/2006 | Reed et al. .................. 192/219.5 |
| 7,255,021 B2 * | 8/2007 | Reed et al. .................. 74/606 R |

* cited by examiner

*Primary Examiner* — Edwin A Young
(74) *Attorney, Agent, or Firm* — Gifford, Krass, Sprinkle, Anderson & Citkowski, P.C.

(57) ABSTRACT

A motor vehicle transmission includes a housing, a parking gear and a retainer. The housing has a support wall. The parking gear is pivotally coupled to the support wall of the housing by a pivot pin. The pivot pin has an end that protrudes outwardly from the support wall. The retainer has a proximal end fixedly secured to the support wall and a distal end contacting the end of the pivot pin to retain the pivot pin in the support wall. The retainer is elastically deformed upon securing the proximal end to the support wall and continuously axially biasing the pivot pin toward the housing. Additionally, the distal end is shaped to retain the end of the pivot pin, thereby axially constraining the pivot pin relative to the housing and, at the same time, preventing rotation of the retainer about the fastener.

16 Claims, 5 Drawing Sheets

RETAINER FOR PARKING GEAR PIVOT

FIELD OF THE INVENTION

The invention relates to a transmission assembly for a motor vehicle. More particularly, the invention relates to a parking gear pivotally coupled to a housing of the transmission assembly and a retainer for retaining a pivot pin for the parking gear in the housing.

BACKGROUND OF THE INVENTION

Motor vehicles include transmissions for transferring power generated by an engine to a set of drive wheels. Transmissions may be manually or automatically shifted. Automatic transmissions include parking gears that are pivotally coupled by a pivot pin to a housing of the transmission for movement in and out of locking engagement with a gear in the transmission. It remains desirable to provide an improved structure for retaining the pivot pin in the housing and ensuring reliable operation of the parking gear.

SUMMARY OF THE INVENTION

According to one aspect of the invention, an automatic transmission assembly includes a housing, a parking gear and a retainer. The housing has a support wall. The parking gear is pivotally coupled to the support wall of the housing by a pivot pin. The pivot pin has an end that protrudes outwardly from the support wall. The retainer has a proximal end fixedly secured to the support wall by a fastener and a distal end contacting the end of the pivot pin to retain the pivot pin in the support wall. The distal end is shaped to retain the end of the pivot pin, thereby axially constraining the pivot pin relative to the housing and, at the same time, preventing rotation of the retainer about the fastener.

According to another aspect of the invention, an automatic transmission assembly includes a housing, a parking gear and a retainer. The housing has a support wall. The parking gear is pivotally coupled to the support wall of the housing by a pivot pin. The pivot pin has an end that protrudes outwardly from the support wall. The retainer has a proximal end fixedly secured to the support wall and a distal end contacting the end of the pivot pin to retain the pivot pin in the support wall. The retainer is elastically deformed upon securing the proximal end to the support wall and continuously axially biasing the pivot pin toward the housing.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
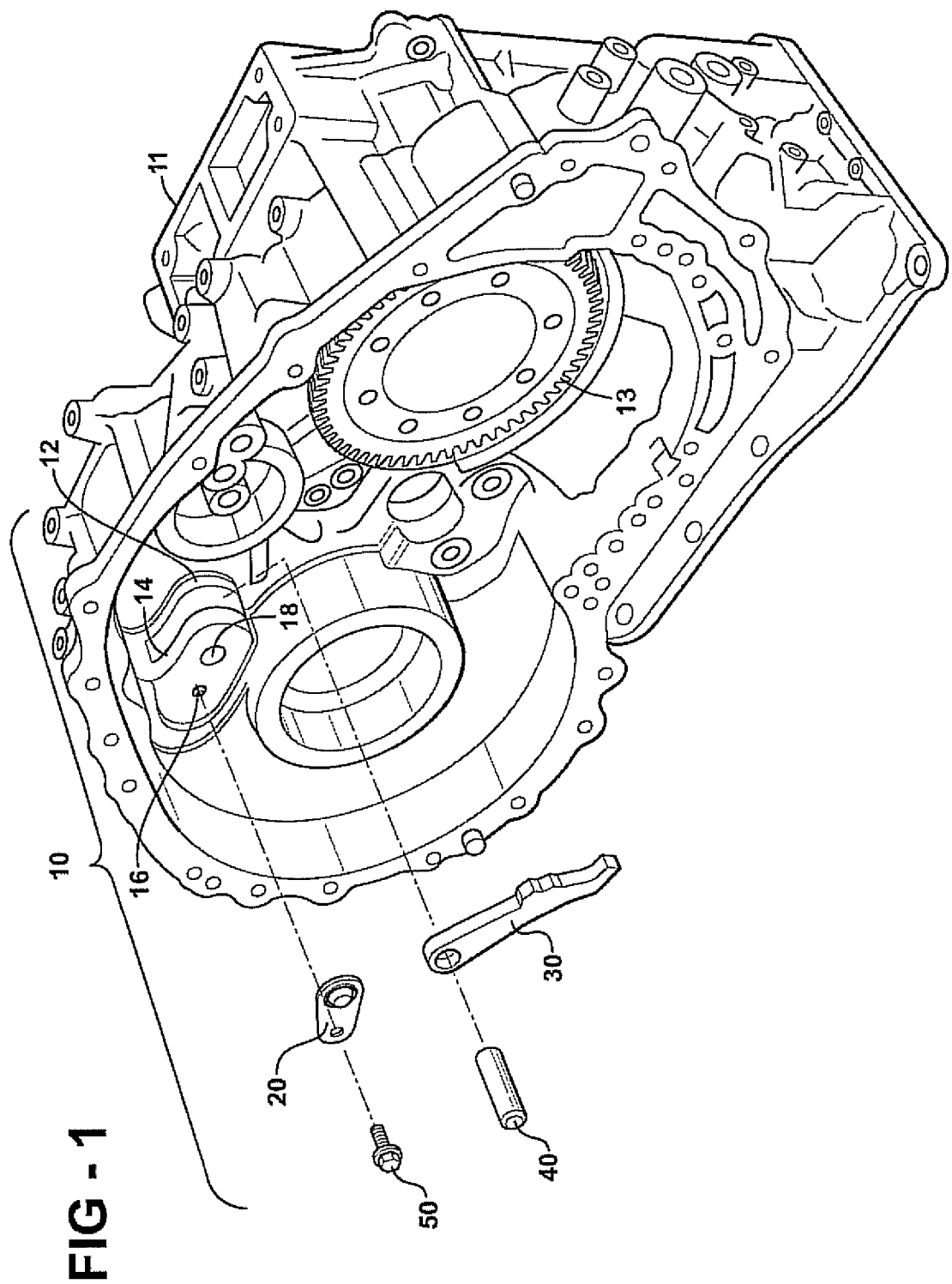
FIG. 1 is an exploded perspective view of a motor vehicle transmission assembly according to one embodiment of the invention.

Referring to FIG. 1, a transmission assembly for a motor vehicle is generally indicated at 10. The transmission assembly 10 includes a housing 11. The housing 11 includes first 12 and second 14 support walls. A parking gear 30 is pivotally coupled to the housing 11 by a pivot pin 40 extending through a bore 18 formed in the support walls 12, 14. The parking gear 30 is movable between engaged and disengaged positions with respect to a gear 13 in the transmission assembly 10. A retainer 20 is fixedly secured to the housing 11 by a fastener 50 extending through a second bore 16 formed in the housing 11. Described in greater detail below, the retainer 20 axially constrains the pivot pin 40 relative to the housing 11 to retain the pivot pin 40 in the bore 18.

Figure 2:
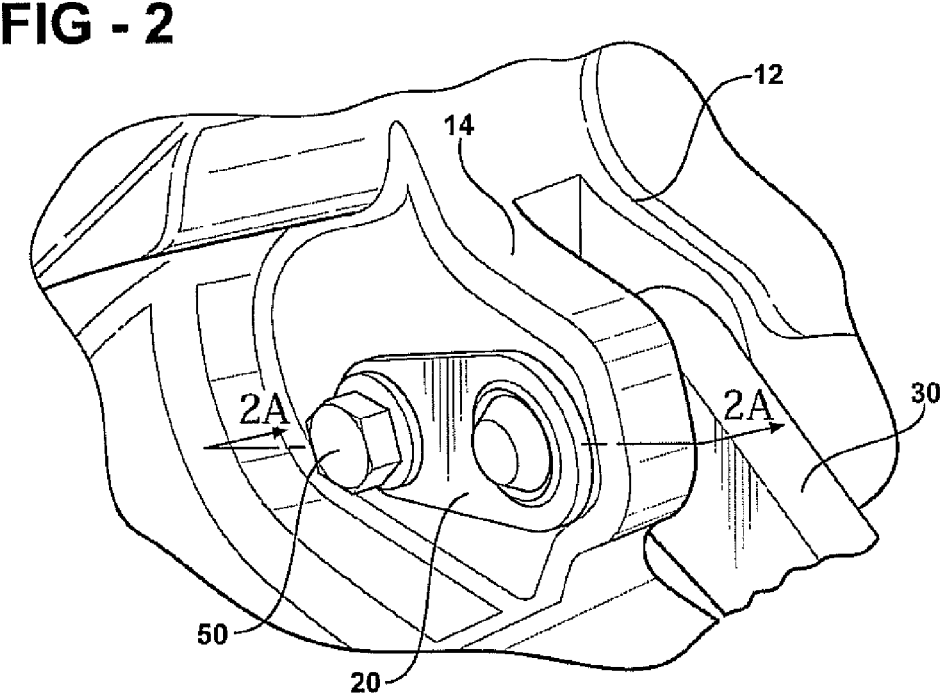
FIG. 2 is an enlarged perspective view of the transmission assembly of FIG. 1.
Figure 2A:
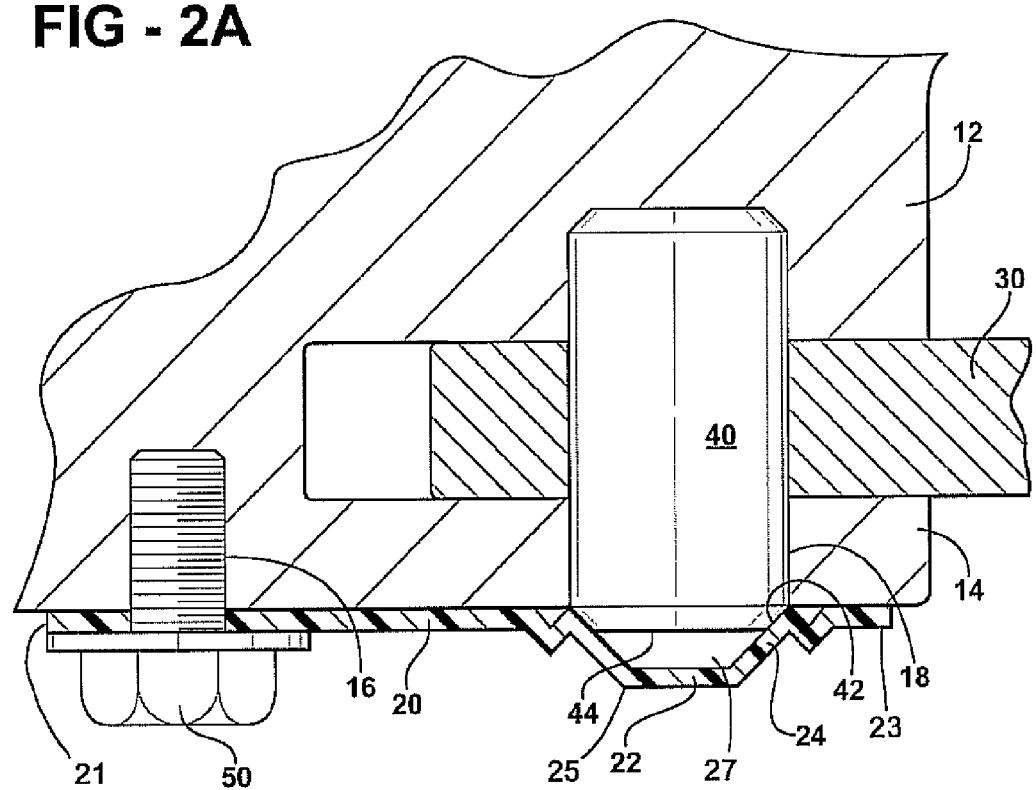
FIG. 2A is a cross sectional view of the transmission assembly as indicated at 2A-2A in FIG. 2.

Referring to FIGS. 2 and 2A, the retainer 20 includes a proximal end 21 coupled to the housing 11 by the fastener 50. The retainer 20 includes a distal end 23 adapted to retain an end 44 of the pivot pin 40 that extends outwardly from one of the support walls 14. The distal end 23 of the retainer 20 is adapted or shaped to capture or hold the end 44 of the pivot pin 44 and prevent rotation of the retainer about the fastener 50.

In the embodiment illustrated in FIGS. 2 and 2A, the distal end 23 of the retainer 20 includes a frustoconical portion 25 with angled sides 24 contacting chamfered surfaces 42 at the end 44 of the pivot pin 40. In one embodiment, the retainer 20 may be formed of a resin or reinforced resin so as to be elastically deformable. The pivot pin 40 may then be formed slightly longer than as illustrated so as to slightly deform the retainer 20 when the fastener 50 is fully installed. The slight deformation of the retainer 20 results in a continuous axial bias of the pivot pin 40 towards the parking gear 30. The angled sides 24 of the frustoconical portion 25 narrow toward an end wall 22 that is spaced apart from the end 44 of the pivot pin 40 to define a gap 27. The gap 27 accommodates tolerances in the length and/or location of the housing 11, pivot pin 40 and/or retainer 20.

Figure 3:
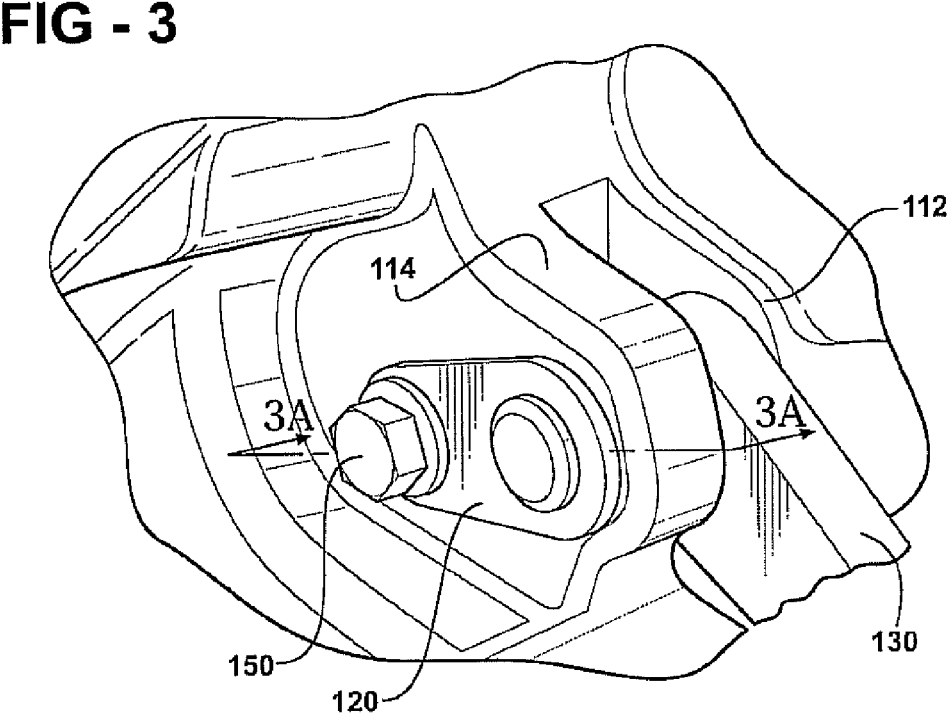
FIG. 3 is an enlarged perspective view of the transmission assembly according to a second embodiment of the invention.
Figure 4:
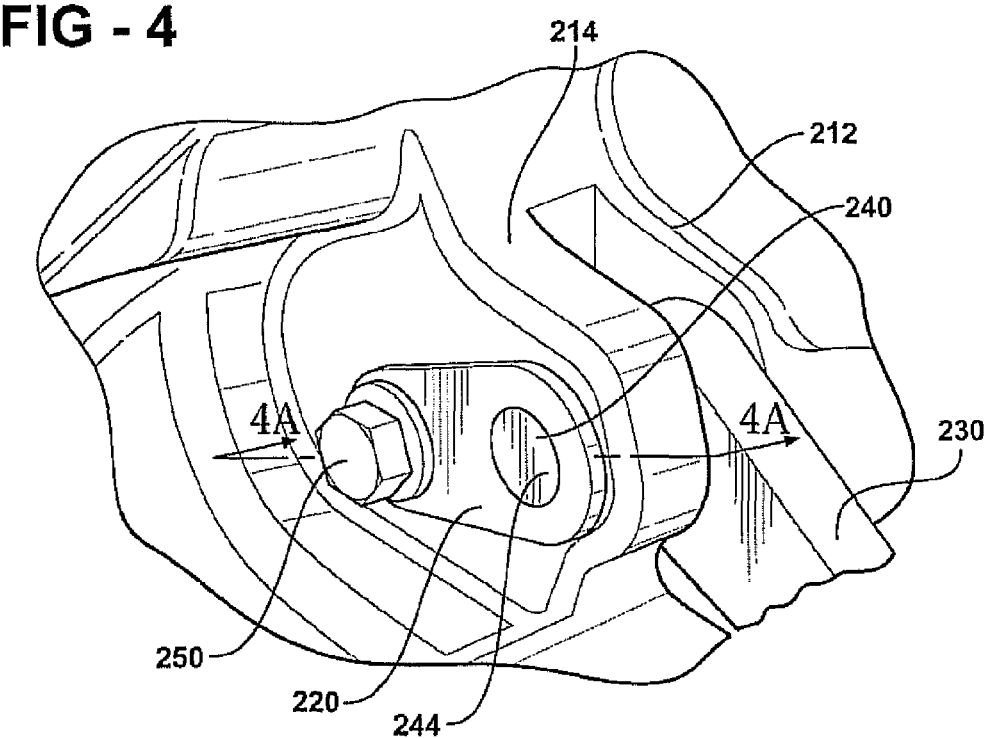
FIG. 4 is an enlarged perspective view of the transmission assembly according to a third embodiment of the invention.
Figure 5:
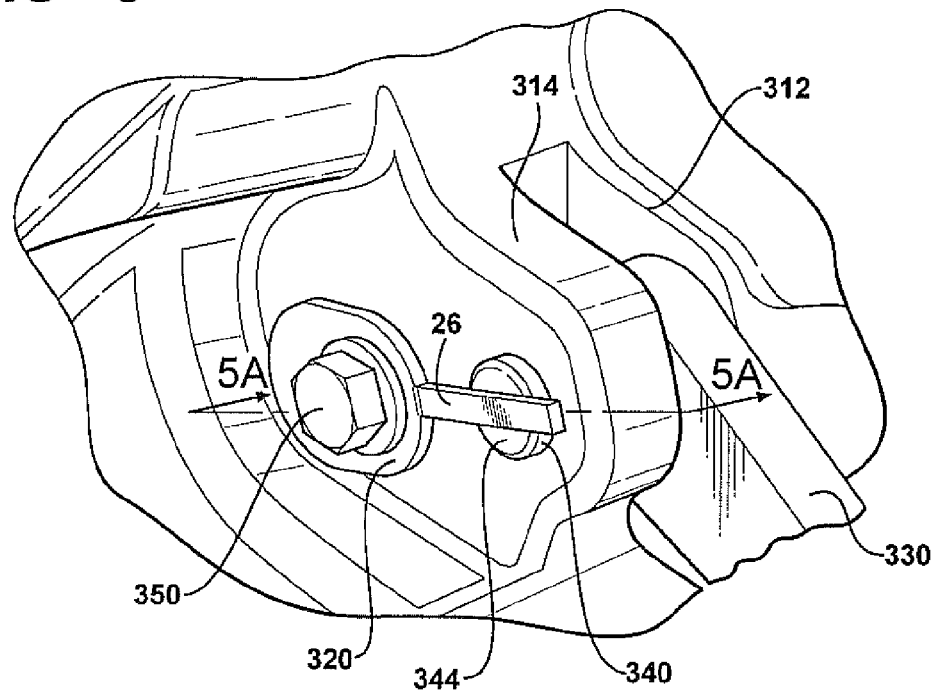
FIG. 5 is an enlarged perspective view of the transmission assembly according to a third embodiment of the invention.

In FIGS. 3-5, alternate embodiments of the retainer are illustrated, wherein like parts are indicated by like numerals offset by one hundred.

Figure 3A:
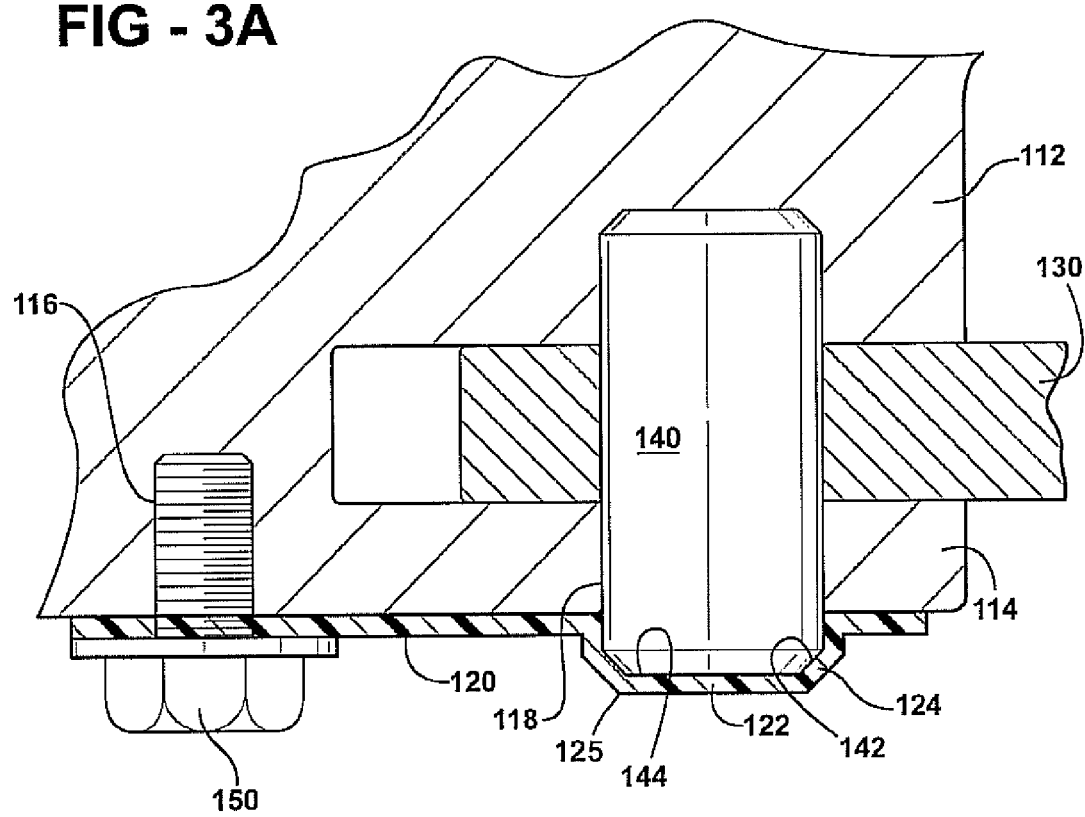
FIG. 3A is a cross sectional view of the transmission assembly as indicated at 3A-3A in FIG. 3.

Referring to FIGS. 3 and 3A, a second embodiment of the retainer is indicated at 120. The retainer 120 in this embodiment differs from the previous embodiment in that the end wall 122 of the frustoconical portion 125 is adjacent to the end 144 of the pivot pin 140. This retainer 120 is particularly useful where tolerances of the various components of the transmission are well controlled and/or packaging space within the housing is limited.

Figure 4A:
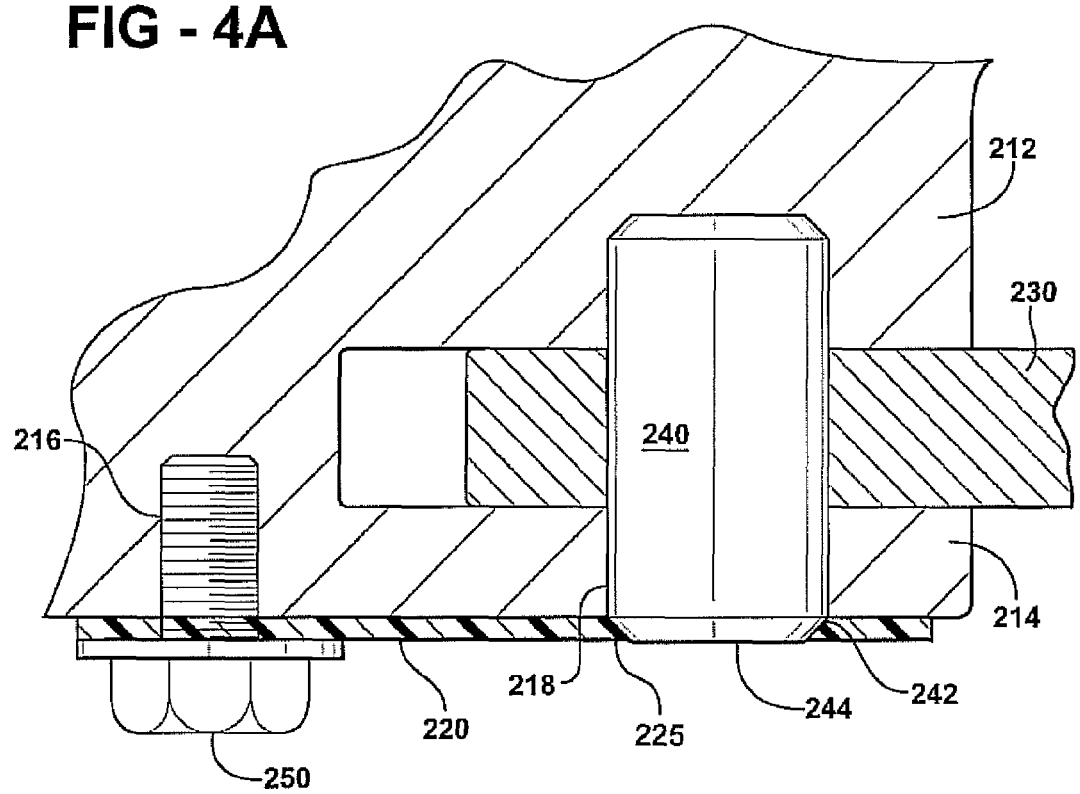
FIG. 4A is a cross sectional view of the transmission assembly as indicated at 4A-4A in FIG. 4.

Referring to FIGS. 4 and 4A, a third embodiment of the retainer is indicated at 220. The retainer 220 in this embodiment includes a frustoconically shaped bore instead of the frustoconical portion of the previous embodiment. The bore is defined by angled surfaces 225 that contact the chamfered surfaces 242 at the end 244 of the pivot pin 240 to retain the pivot pin 240 in the bore 218 and prevent rotation of the retainer 220 about the fastener 250.

Figure 5A:
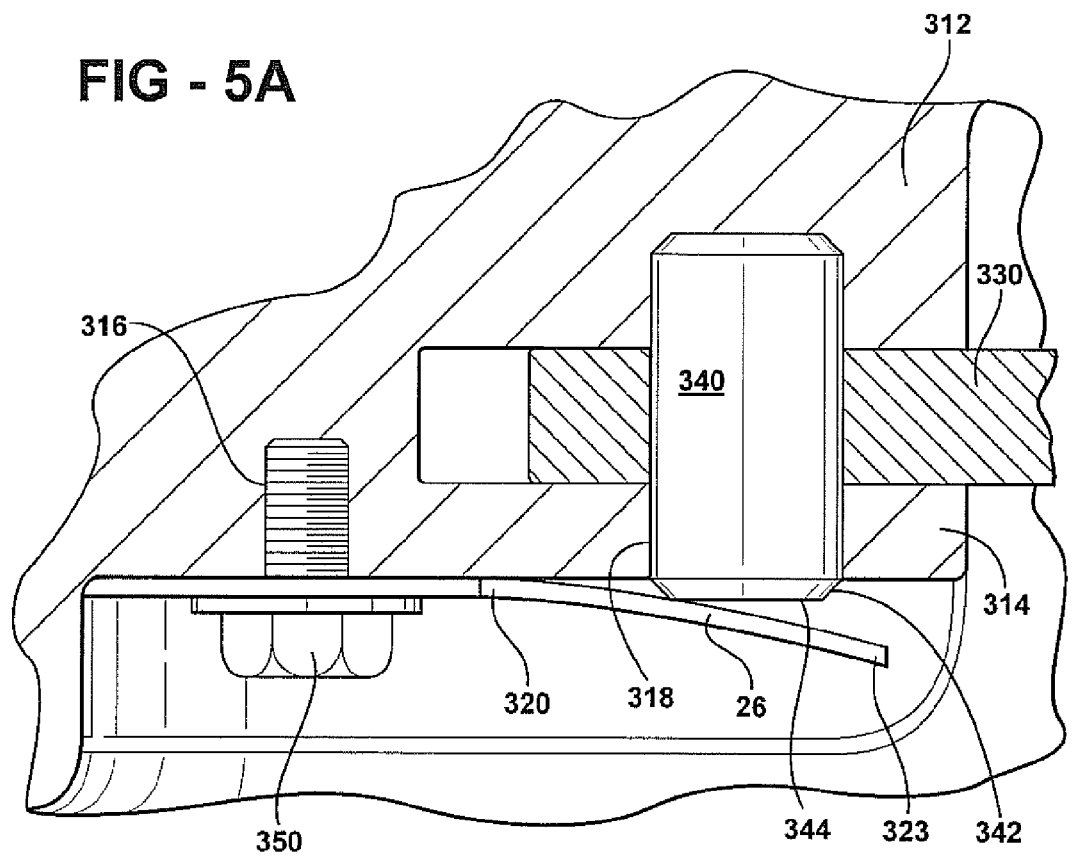
FIG. 5A is a cross sectional view of the transmission assembly as indicated at 5A-5A in FIG. 5.

Referring to FIGS. 5 and 5A, a fourth embodiment of the retainer is indicated at 320. In this embodiment, the distal end 323 of the retainer 320 lacks the frustoconical portion or surfaces of the previous embodiments and instead includes an elastically deformable beam 26. The beam 26 is elastically deformed when the fastener 350 is installed in the bore 316 to assemble the retainer 320 to the housing. The deformation of the beam 26 results in a continuous axial bias of the pivot pin 340 toward the first wall 312 of the housing. The friction between the beam 26 and the end 344 of the pivot pin 340 prevents rotation of the retainer 320 about the fastener 350.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. An automatic transmission assembly comprising:
    a housing having a support wall;
    a parking gear pivotally coupled to the support wall of the housing by a pivot pin, the pivot pin having an end that protrudes outwardly from the support wall; and
    a retainer having a proximal end fixedly secured to the support wall by a fastener and a distal end contacting the end of the pivot pin to retain the pivot pin in the support wall, the distal end being shaped to retain the end of the pivot pin and thereby axially constraining the pivot pin relative to the housing and, at the same time, preventing rotation of the retainer about the fastener.

2. The automatic transmission assembly as set forth in claim 1, wherein the distal end of the retainer includes a frustoconical portion with angled surfaces for contacting chamfered edges along the end of the pivot pin.

3. The automatic transmission assembly as set forth in claim 2, wherein the angled surfaces converge toward an end wall of the frustoconical portion.

4. The automatic transmission assembly as set forth in claim 3, wherein the end wall is axially spaced apart from the end of the pivot pin.

5. The automatic transmission assembly as set forth in claim 3, wherein the end wall is disposed adjacent to the end of the pivot pin.

6. The automatic transmission assembly as set forth in claim 1, wherein the retainer includes a beam extending between the proximal and distal ends thereof.

7. The automatic transmission assembly as set forth in claim 6, wherein the beam is elastically deformed upon securing the proximal end of the retainer to the support wall so as to continuously axially bias the pivot pin toward the housing.

8. The automatic transmission assembly as set forth in claim 1, wherein the retainer is elastically deformed upon coupling of the proximal end to the support wall.

9. The automatic transmission assembly as set forth in claim 8, wherein the retainer is made from a resin material.

10. An automatic transmission assembly comprising:
    a housing having a support wall;
    a parking gear pivotally coupled to the support wall of the housing by a pivot pin, the pivot pin having an end that protrudes outwardly from the support wall; and
    a retainer having a proximal end fixedly secured to the support wall and a distal end contacting the end of the pivot pin to retain the pivot pin in the support wall, the retainer being elastically deformed upon securing the proximal end to the support wall and continuously axially biasing the pivot pin toward the housing.

11. The automatic transmission assembly as set forth in claim 10, wherein the end of the pivot pin includes chamfered edges.

12. The automatic transmission assembly as set forth in claim 11, wherein the distal end of the retainer includes angled surfaces for contacting the chamfered edges at the end of the pivot pin.

13. The automatic transmission assembly as set forth in claim 12, wherein the distal end of the retainer includes a frustoconical portion defining the angled surfaces.

14. The automatic transmission assembly as set forth in claim 13, wherein the angled surfaces narrow towards an end wall of the frustoconical portion.

15. The automatic transmission assembly as set forth in claim 14, wherein the end wall is spaced apart from the end of the pivot pin.

16. The automatic transmission assembly as set forth in claim 14, wherein the end wall is adjacent the end of the pivot pin.

* * * * *